(12) United States Patent
Ning et al.

(10) Patent No.: US 12,314,337 B2
(45) Date of Patent: May 27, 2025

(54) PAGE OPERATION PROCESSING METHOD, ELECTRONIC DEVICE, AND NON-TRANSITORY COMPUTER-READABLE STORAGE MEDIUM

(71) Applicant: BEIJING BYTEDANCE NETWORK TECHNOLOGY CO., LTD., Beijing (CN)

(72) Inventors: Liaoyuan Ning, Beijing (CN); Hongze Liu, Beijing (CN); Cong Wang, Beijing (CN); Guilin Cui, Beijing (CN); Zengchan Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/887,741

(22) Filed: Aug. 15, 2022

(65) Prior Publication Data

US 2022/0391457 A1   Dec. 8, 2022

Related U.S. Application Data

(63) Continuation of application No. PCT/CN2021/074854, filed on Feb. 2, 2021.

(30) Foreign Application Priority Data

Feb. 20, 2020   (CN) .......................... 202010106857.7

(51) Int. Cl.
*G06F 16/958*   (2019.01)
*G06F 9/54*   (2006.01)
(Continued)

(52) U.S. Cl.
CPC ............ *G06F 16/958* (2019.01); *G06F 9/542* (2013.01); *G06F 16/93* (2019.01); *G06F 40/134* (2020.01)

(58) Field of Classification Search
CPC ........ G06F 16/958; G06F 9/542; G06F 16/93; G06F 40/134; G06F 16/953;
(Continued)

(56) References Cited

U.S. PATENT DOCUMENTS 6,430,567 B2 * 8/2002 Burridge ............. G06Q 10/107
707/999.102
6,826,595 B1 * 11/2004 Barbash ............... G06F 40/169
709/227

(Continued)

FOREIGN PATENT DOCUMENTS

CN    102707884 A    10/2012
CN    102779171 A    11/2012
(Continued)

OTHER PUBLICATIONS

International Search Report issued Apr. 30, 2021 in International Application No. PCT/CN2021/074854.
(Continued)

*Primary Examiner* — Sheree N Brown

(57) ABSTRACT

Provided are a page operation processing method and apparatus, a device and a storage medium. The page operation processing method includes: detecting an operation event triggered by a first user of a collaboration platform for a target content in a web page; calling a corresponding capability component of the collaboration platform based on the operation event; generating a first collaboration area in the web page based on the capability component and the operation event, and generating a first operation result in the first collaboration area; and receiving a collaborative operation of a second user of the collaboration platform in the first collaboration area, and generating a second operation result.

14 Claims, 5 Drawing Sheets

(51) Int. Cl.
*G06F 16/93* (2019.01)
*G06F 40/134* (2020.01)

(58) Field of Classification Search
CPC ...... G06F 16/957; G06F 40/58; G06F 40/166; G06F 40/197; G06F 16/273; G06F 3/0484; G06F 40/117; G06F 40/169; G06F 16/122; G06F 16/1734; G06F 16/176; G06F 16/182; G06F 3/0481; G06F 3/0482; G06F 40/194; G06F 40/216; G06F 40/143; G06Q 10/101; G06Q 10/10; G06Q 10/107; H04L 51/046; H04L 51/00; H04L 51/234; H04L 51/42; H04L 67/1095; H04L 69/329; H04L 51/18; H04L 51/216; H04L 65/4025; H04L 67/147; H04W 4/12
USPC .......................................................... 707/608
See application file for complete search history.

(56) References Cited

U.S. PATENT DOCUMENTS

| | | | | |
|---|---|---|---|---|
| 7,634,735 | B2* | 12/2009 | McCary | G06Q 10/10 715/744 |
| 8,484,288 | B2* | 7/2013 | Lakshmanan | H04L 67/1001 709/204 |
| 8,566,353 | B2* | 10/2013 | Fink | H04N 21/454 707/782 |
| 8,719,251 | B1* | 5/2014 | English | G06F 16/90328 707/713 |
| 8,826,375 | B2* | 9/2014 | Smith | G06Q 10/10 709/201 |
| 8,965,983 | B2* | 2/2015 | Costenaro | G06F 40/169 715/255 |
| 9,503,402 | B2* | 11/2016 | Cue | G06F 16/273 |
| 9,530,050 | B1* | 12/2016 | Erol | G06F 16/434 |
| 9,690,785 | B1* | 6/2017 | Vagell | G06F 16/93 |
| 9,710,438 | B2* | 7/2017 | Vasudevan | G06F 40/134 |
| 10,133,716 | B2* | 11/2018 | Konnola | G06Q 10/101 |
| 10,606,576 | B1* | 3/2020 | Tung | G06F 9/5077 |
| 10,698,647 | B2* | 6/2020 | Shipper | G06F 3/0482 |
| 10,853,557 | B2* | 12/2020 | Konnola | G06Q 10/101 |
| 10,868,790 | B2* | 12/2020 | Luthra | H04L 51/52 |
| 10,949,396 | B2* | 3/2021 | Yang | H04L 51/046 |
| 11,240,320 | B2* | 2/2022 | Milvaney | H04L 67/147 |
| 11,379,686 | B2* | 7/2022 | Coven | G06F 9/44526 |
| 2003/0014513 | A1* | 1/2003 | Ruths | G06F 9/465 709/223 |
| 2003/0018719 | A1* | 1/2003 | Ruths | G06F 9/52 709/205 |
| 2005/0257158 | A1* | 11/2005 | Lombardo | G06F 40/166 715/764 |
| 2006/0129942 | A1* | 6/2006 | McCary | G06Q 10/10 715/741 |
| 2007/0011155 | A1* | 1/2007 | Sarkar | G06F 16/38 707/999.005 |
| 2008/0168065 | A1* | 7/2008 | Kanevsky | G06F 16/958 |
| 2009/0132601 | A1* | 5/2009 | Cundiff | G06F 16/903 |
| 2009/0182727 | A1* | 7/2009 | Majko | G06F 16/9535 707/999.005 |
| 2009/0297118 | A1 | 12/2009 | Fink et al. | |
| 2010/0094859 | A1* | 4/2010 | Gupta | G06F 16/9562 715/745 |
| 2010/0223261 | A1* | 9/2010 | Sarkar | G06Q 30/02 707/726 |
| 2010/0287183 | A1* | 11/2010 | Kamireddy | G06F 16/951 707/769 |
| 2011/0087732 | A1* | 4/2011 | Lakshmanan | H04L 67/1001 709/204 |
| 2011/0178981 | A1 | 7/2011 | Bowen et al. | |
| 2012/0047426 | A1* | 2/2012 | Hauser | G06F 21/55 715/234 |
| 2012/0072855 | A1* | 3/2012 | Baldwin | H04L 51/043 715/752 |
| 2012/0226493 | A1* | 9/2012 | Grabarnik | G06F 40/242 704/9 |
| 2013/0080545 | A1* | 3/2013 | Datta | H04L 51/18 709/206 |
| 2013/0275429 | A1* | 10/2013 | York | G06F 16/435 707/E17.002 |
| 2014/0089428 | A1 | 3/2014 | Jia | |
| 2014/0189493 | A1* | 7/2014 | Chandra | G06F 16/9562 715/234 |
| 2014/0201231 | A1* | 7/2014 | Smith | G06F 16/951 707/769 |
| 2014/0250058 | A1* | 9/2014 | Thiruvidan | G06F 16/93 707/608 |
| 2015/0134425 | A1* | 5/2015 | LeGris | G06Q 10/0639 705/7.38 |
| 2016/0063012 | A1* | 3/2016 | Sundaresan | G06F 16/338 707/706 |
| 2016/0182412 | A1* | 6/2016 | Kabbes | H04L 69/329 709/206 |
| 2018/0181552 | A1* | 6/2018 | Konnola | G06F 16/93 |
| 2018/0232346 | A1* | 8/2018 | Konnola | G06Q 10/101 |
| 2018/0248837 | A1 | 8/2018 | Zmener | |
| 2020/0090125 | A1* | 3/2020 | Gibbs | G06N 3/008 |
| 2020/0133742 | A1* | 4/2020 | Tung | G06F 16/901 |
| 2020/0351314 | A1* | 11/2020 | Butcher | H04L 65/4025 |
| 2021/0192126 | A1* | 6/2021 | Gehrmann | G06N 20/00 |
| 2021/0216704 | A1* | 7/2021 | Peterson | G06Q 10/101 |

FOREIGN PATENT DOCUMENTS

| | | |
|---|---|---|
| CN | 103856395 A | 6/2014 |
| CN | 104504131 A | 4/2015 |
| CN | 104572883 A | 4/2015 |
| CN | 104980766 A | 10/2015 |
| CN | 105094841 A | 11/2015 |
| CN | 105721280 A | 6/2016 |
| CN | 106407282 A | 2/2017 |
| CN | 106973075 A | 7/2017 |
| CN | 107016013 A | 8/2017 |
| CN | 109308337 A | 2/2019 |
| CN | 109582430 A | 4/2019 |
| CN | 109670159 A | 4/2019 |
| CN | 109976617 A | 7/2019 |
| CN | 113282816 A | 8/2021 |
| GB | 2555157 A | 4/2018 |
| JP | 2003150542 A | 5/2003 |
| JP | 2019023943 A | 2/2019 |

OTHER PUBLICATIONS

First Search Report issued Jan. 5, 2023 in Chinese Application No. 202010106857.7, with English translation (6 pages).
First Office Action issued Jan. 12, 2023 in Chinese Application No. 202010106857.7, with English translation (14 pages).
Notice of Reasons for Refusal dated Sep. 14, 2023 in JP Appl. No. 2022-549100, English translation (6 pages).
EP Search Report issued Jul. 20, 2023 in EP Application No. 21756773.4 (4 pages).
Written Opinion for International Application No. PCT/CN2021/074854, mailed Apr. 30, 2021, 07 Pages.
Office action received from Singapore patent application No. 11202252117Q mailed on Mar. 4, 2025, 12 pages.

* cited by examiner

PAGE OPERATION PROCESSING METHOD, ELECTRONIC DEVICE, AND NON-TRANSITORY COMPUTER-READABLE STORAGE MEDIUM

CROSS-REFERENCE TO RELATED APPLICATIONS

The is a continuation of International Patent Application No. PCT/CN2021/074854, filed on Feb. 2, 2021, which claims priority to Chinese Patent Application No. 202010106857.7 filed with the China National Intellectual Property Administration (CNIPA) on Feb. 20, 2020, the disclosures of which are incorporated herein by reference in their entireties.

TECHNICAL FIELD

Embodiments of the present disclosure relate to the field of computer technologies, for example, a page operation processing method, an electronic device and a non-transitory computer-readable storage medium.

BACKGROUND

With the rapid development of communication technologies, more and more instant messaging tools and collaboration creation tools have been created to enable better communication and collaboration within enterprises. For example, the instant messaging tools include DingTalk, WeChat, Slack, etc., and the collaboration creation tools include Shimo Docs, G-Suite, etc.

In the process of using the preceding tools, if related operations such as translation, commenting, search and sharing with other users need to be performed on related contents in a web page, the user needs to leave the web page and start applications corresponding to the related operations. For example, if the user finds important contents and needs to communicate with other users or share the important contents with other users, the user can only acquire related information from the web page by means of copying or taking screenshots, and then communicate or share the related information based on an instant messaging tool, causing low user operation efficiency and poor user experience.

SUMMARY

Embodiments of the present disclosure provide a page operation processing method, an electronic device and a non-transitory computer-readable storage medium, so that the efficiency of operations of users in a web page can be effectively improved, and the user experience can be enhanced.

An embodiment of the present disclosure provides a page operation processing method. The page operation processing method includes steps described below.

An operation event triggered by a first user of a collaboration platform for a target content in a web page is detected.

A corresponding capability component of the collaboration platform is called based on the operation event.

A first collaboration area is generated in the web page based on the capability component and the operation event, and a first operation result is generated in the first collaboration area.

A collaborative operation of a second user of the collaboration platform in the first collaboration area is received, and a second operation result is generated.

An embodiment of the present disclosure further provides an electronic device. The electronic device includes at least one processing apparatus; and a storage apparatus configured to store at least one program; wherein the at least one program, when executed by the at least one processing apparatus, causes the at least one processing apparatus to implement: detecting an operation event triggered by a first user of a collaboration platform for a target content in a web page; calling a corresponding capability component of the collaboration platform based on the operation event; generating a first collaboration area in the web page based on the capability component and the operation event, and generating a first operation result in the first collaboration area; and receiving a collaborative operation of a second user of the collaboration platform in the first collaboration area, and generating a second operation result.

An embodiment of the present disclosure further provides a non-transitory computer-readable storage medium storing a computer program, where the computer program, when executed by a processing apparatus, implements: detecting an operation event triggered by a first user of a collaboration platform for a target content in a web page; calling a corresponding capability component of the collaboration platform based on the operation event; generating a first collaboration area in the web page based on the capability component and the operation event, and generating a first operation result in the first collaboration area; and receiving a collaborative operation of a second user of the collaboration platform in the first collaboration area, and generating a second operation result.

DETAILED DESCRIPTION

Figure 1:
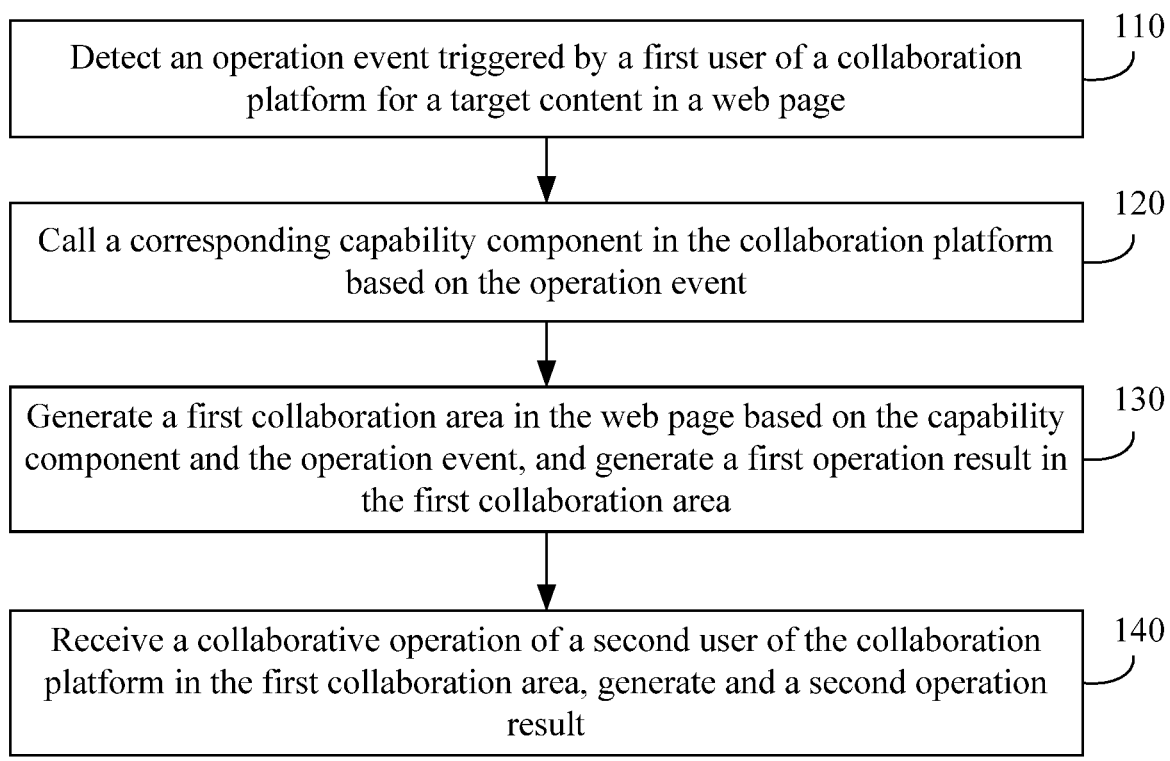
FIG. 1 is a flowchart of a page operation processing method according to an embodiment of the present disclosure.

Embodiments of the present disclosure are described hereinafter with reference to the drawings. Although some embodiments of the present disclosure are shown in the drawings, it is to be understood that the present disclosure may be implemented in various forms and should not be construed as limited to the embodiments set forth herein. It is to be understood that the drawings and the embodiments of the present disclosure are merely illustrative and are not intended to limit the scope of the present disclosure.

It is to be understood that various steps recited in method embodiments of the present disclosure may be performed in a different order, and/or in parallel. In addition, the method embodiments may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description hereinafter.

References to "first", "second" and the like in the present disclosure are merely intended to distinguish one from another apparatus, module, or unit and are not intended to limit the order or interrelationship of the functions performed by the apparatus, module, or unit.

References to modifications of "one" or "a plurality" in the present disclosure are intended to be illustrative and not limiting, and that those skilled in the art should understand that "one" or "a plurality" should be understood as "one or more" unless clearly expressed in the context.

The names of messages or information exchanged between multiple apparatuses in the embodiments of the present disclosure are only for illustrative purposes and are not intended to limit the scope of such messages or information.

FIG. 1 is a flowchart of a page operation processing method according to an embodiment of the present disclosure. The embodiment of the present disclosure may be applied to a case of performing operations such as communication, sharing and translation based on a target content of a web page when various instant messaging tools are used, and the method may be executed by a page operation processing apparatus. The apparatus may be composed of hardware and/or software and may be generally integrated in a device having a page operation processing function. The device may be an electronic device such as a server, a mobile terminal or a server cluster. As shown in FIG. 1, the method includes steps described below.

In step 110, an operation event triggered by a first user of a collaboration platform for a target content in a web page is detected.

The web page is a page outside the collaboration platform, that is, a web page not belonging to the collaboration platform, and may be a page opened when a user uses Software-as-a-Service (SaaS), or may be a page opened when a user uses a browser or other applications.

In an embodiment, a collaboration platform plug-in has been preconfigured in the web page. In this manner, the web page which does not adapt to the collaboration platform but is configured with the collaboration platform plug-in may also have functions corresponding to the collaboration platform.

The operation event triggered by the first user of the collaboration platform for the target content in the web page is detected in real time or at preset time intervals, and subsequent steps are executed when the operation event triggered by the first user for the target content in the web page is detected. The operation event may include at least one of an instant messaging event, a commenting event, a translation event, a search event, a document generation event, a business card generation event, a calendar creation event or a mail editing event. Exemplarily, the instant messaging event may be understood as that a user shares the target content (such as a piece of text or a picture) in the web page with other people or communicates with other people about the target content; the commenting event may be understood as that a user comments on the target content in the web page to express opinions of the user; the translation event may be understood as that a user translates the target content in the web page; the search event may be understood as that a user searches for the target content in the webpage to collect information of interest to the user; the document generation event may be understood as that a user archives the target content in the web page in the form of a document to facilitate direct access to the generated document during subsequent use; the business card generation event may be understood as that a user generates a business card for the target content, such as related information (such as the gender, the age, the occupation) of a person, in the web page; the calendar generation event may be understood as that a user generates a calendar for the target content in the web page, such as a calendar about performing meeting discussion on the target content in the web page on a certain date; the mail editing event may be understood as that a user sends the target content in the web page to mailboxes of other users in the form of a mail.

In step 120, a corresponding capability component of the collaboration platform is called based on the operation event.

In the embodiment of the present disclosure, the collaboration platform is configured with different capability components, so that the collaboration platform has different functions. For example, if the collaboration platform has a translation capability, the collaboration platform is configured with a translation capability component; for another example, if the collaboration platform has a commenting capability, the collaboration platform is configured with a commenting capability component. In an embodiment, the web page may be associated with the collaboration platform by a link address, and the link address may be a Uniform Resource Locator (URL) address of a collaboration platform component. When the operation event triggered by the first user of the collaboration platform for the target content in the web page is detected, the capability component corresponding to the operation event in the collaboration platform is called according to the link address, so that the web page has functions corresponding to the collaboration platform. Exemplarily, when it is detected that the operation event triggered by the first user of the collaboration platform for the target content in the web page is a translation event, a corresponding translation capability component of the collaboration platform is called; when it is detected that the operation event triggered by the first user of the collaboration platform for the target content in the web page is a commenting event, a corresponding commenting capability component of the collaboration platform is called; when it is detected that the operation event triggered by the first user of the collaboration platform for the target content in the web page is a document generation event, a corresponding document generation capability component of the collaboration platform is called. It is to be understood that when the collaboration platform has the functions such as instant messaging, commenting, translation, business card generation, calendar generation, search, document generation and mail editing, the web page may also have the functions such as instant messaging, commenting, translation, business card generation, calendar generation, search, document generation and mail editing by calling the corresponding capability components of the collaboration platform, so that the user can directly complete the corresponding operation event in the web page for the target content.

In step 130, a first collaboration area is generated in the web page based on the capability component and the operation event, and a first operation result is generated in the first collaboration area.

The first collaboration area is generated in the web page based on the capability component and the operation event, and the first operation result is generated in the first collaboration area in response to the operation event. When different capability components are called, sizes of first collaboration areas generated in the web page and positions of first collaboration areas in the web page may be the same or different, which are not limited in the embodiment.

Exemplarily, when the operation event triggered by the first user for the target content in the web page is a commenting event, that is, when the first user needs to comment on the target content in the web page, a commenting capability component in the collaboration platform is called, and the first collaboration area is generated in the web page. The first collaboration area here may be understood as an area for presenting comment information to the user. Then, the commenting capability component generates a comment result based on comment information that is input by the user for the target content and displays the comment result in the first collaboration area. In this manner, the user can directly comment on the target content in the web page, the comment content can be visually displayed in a specific area in the web page, and the real feeling of the user at that time can be directly recorded. When the first user thinks that the comment result cannot truly reflect the feeling of the first user at that time, the first user may directly perform related operations such as modification or deletion on the comment result (that is, the first operation result) in the first collaboration area to update the comment result, and save the updated comment result.

Exemplarily, when the operation event triggered by the first user for the target content in the web page is a translation event, that is, when the first user needs to translate the target content in the web page, a translation capability component in the collaboration platform is called, and the first collaboration area is generated in the web page. The first collaboration area here may be understood as an area for presenting a translation result to the user. Then, the target content is translated based on the translation capability component to generate the translation result, and the translation result is displayed in the first collaboration area. In this manner, a series of cumbersome operations can be effectively avoided, for example, the user copies the text (the target content) in the web page needing to be translated into translation software such as Youdao, and returns to the web page after the translation is completed. When the first user thinks that the translation result is inaccurate, the first user may directly modify and save the translation result (that is, the first operation result) in the first collaboration area, so that the first user can perform personalized translation or annotation according to a corporate knowledge base, and can also perform collaborative editing on the translation result to make the translation result more accurate.

When the operation event triggered by the first user for the target content in the web page is any one of an instant messaging event, a search event, a document generation event, a business card generation event, a calendar creation event or a mail editing event, the process of calling a corresponding capability component in the collaboration platform based on the operation event and then responding to the operation event based on the called capability component is similar to the preceding process of responding to the translation event in the web page based on the collaboration platform, which is not repeated here.

In step 140, a collaborative operation of a second user of the collaboration platform in the first collaboration area is received, and a second operation result is generated.

In the embodiment of the present disclosure, after the first operation result is generated in the first collaboration area, the collaborative operation of the second user of the collaboration platform in the first collaboration area may be continuously received, and the second operation result is generated. In an embodiment, the step in which the collaborative operation of the second user of the collaboration platform in the first collaboration area is received, and the second operation result is generated includes that: a collaborative operation of the second user on the target content is received, and a second operation result for the target content is generated; or a collaborative operation of the second user on the first operation result is received, and a second operation result for the first operation result is generated.

The collaborative operation of the second user in the first collaboration area may be a related operation for the first operation result, such as modification, deletion and adding. Exemplarily, when the operation event triggered by the first user for the target content in the web page is a translation event and the second user considers that the translation result (that is, the first operation result) is inaccurate, the second user may directly perform a modification operation on the translation result (that is, the first operation result) in the first collaboration area to generate the second operation result. In this manner, the second user can perform collaborative editing on the translation result to make the translation result accurate. Exemplarily, when the operation event triggered by the first user for the target content in the web page is a commenting event, the first operation result generated in the first collaboration area is comment information of the first user for the target content, and at this time, the second user may reply to the first operation result (that is, the comment information of the first user) in the first collaboration area to generate the second operation result. In this manner, the first user and the second user can interact with each other in the web page.

In an embodiment, the collaborative operation of the second user in the first collaboration area may also be an operation for the target content. In an embodiment, when the collaborative operation is an operation for the target content, the operation type of the collaborative operation is the same as the operation type of the operation event triggered by the first user for the target content in the web page. Exemplarily, when the operation event triggered by the first user for the target content in the web page is a translation event and the second user thinks that the translation result (that is, the first operation result) is inaccurate, the second user may directly re-translate the target content to generate the second operation result. Exemplarily, when the operation event triggered by the first user for the target content in the web page is a commenting event, the first operation result generated in the first collaboration area is comment information of the first user for the target content, and at this time, the second user may also express opinions of the second user for the target content in the first collaboration area to generate the second operation result (that is, comment information of the second user for the target content).

According to the technical scheme of the embodiment of the present disclosure, the operation event triggered by the first user of the collaboration platform for the target content in the web page is detected; the corresponding capability component in the collaboration platform is called based on the operation event; the first collaboration area is generated in the web page based on the capability component and the operation event, and the first operation result is generated in the first collaboration area; and the collaborative operation of the second user of the collaboration platform in the first collaboration area is received, and the second operation result is generated. According to the page operation processing method provided in the embodiment of the present disclosure, the collaboration platform component is configured in the web page, so that the web page has functions corresponding to the collaboration platform. In this manner, when a user performs a related operation on a content in the web page, not only the page operation can be performed without leaving the web page to improve the efficiency of the operation of the user in the page, but also other users can directly perform a collaborative operation in the page to improve the capability for the interaction between users in the web page.

In some embodiments, the step in which the first collaboration area is generated in the web page, and the first operation result is generated in the first collaboration area includes that: the first collaboration area is generated in a specific area of the web page, the target content is quoted to a first area in the first collaboration area, and the first operation result is generated in a second area in the first collaboration area. Exemplarily, the first collaboration area may be generated in a specific area of the web page. For example, the first collaboration area may be generated at an upper left corner or a lower right corner of the web page. For another example, the first collaboration area may be generated in a blank area in the web page. In this manner, the generated first collaboration area does not affect the reading of the user for other contents in the web page. Alternatively, a hidden first collaboration area may be generated over the target content, and the target content is highlighted. When the mouse hovers over or clicks on the area, the first collaboration area appears for quick positioning and viewing by the user.

In an embodiment, after the first collaboration area is generated in a specific area of the web page, since the first operation result is generated according to the operation performed by the first user on the target content in the web page, to enable the first user or other users to know the object of the first operation result clearly, the target content may be quoted to the first area in the first collaboration area; for example, the target content is displayed in a highlighted form in the first area in the first collaboration area.

In some embodiments, after the first operation result is generated in the first collaboration area, the following steps are further included: a reading identifier is generated in the first area and/or the second area in the first collaboration area; and after a user of the collaboration platform reads a content in the first area and/or a content in the second area, a reading status of the reading identifier is updated. In this manner, a read status or an unread status of the first operation result (for example, a piece of comment information or a translation result) by one or more users may be displayed, so that the first user can quickly know the attention to the first operation result paid by other users.

Exemplarily, after the first operation result is generated in the second area in the first collaboration area, the reading identifier is generated in the first area and/or the second area in the first collaboration area. The reading identifier is used for characterizing the reading status by a user of the collaboration platform for the target content in the first area or the first operation result in the second area. It is to be noted that when the user of the collaboration platform does not read the content in the first area and/or the second area, the reading identifier in the first area and/or the second area is the unread status; when the user of the collaboration platform reads the content in the first area and/or the second area, the reading identifier in the first area and/or the second area may be updated to the read status.

In some embodiments, the step in which the first operation result is generated in the first collaboration area includes that: when a directional command is received in the first collaboration area, a directional link content is generated according to the directional command, where the directional command includes a directional identifier and an object name. In this manner, other users can quickly enter the web page according to the link content and quickly view the first operation result for the target content.

In an embodiment, when the object name is a user name in the collaboration platform, the method further includes the following step: a notification message is sent to a user corresponding to the user name, where the notification message includes the target content and/or the first operation result, so that the user turns to the web page through the notification message. Exemplarily, when the first user wants the first operation result generated based on the operation event by the first user for the target content in the web page and/or the target content to be quickly seen by other users of the collaboration platform, the user may input the directional identifier and a user name into the first collaboration area, where the directional identifier may be the identifier @. Exemplarily, when the operation event triggered by the first user in the web page is a commenting event, if the first user wants the comment information for the target content in the web page and/or the target content to be quickly seen by other users of the collaboration platform, the notification message may be generated based on the target content and/or the first operation result and sent to a user, so that the user turns to the web page through the notification message and thus can view in the web page the target content and/or the first operation result generated based on the operation event triggered by the first user for the target content.

In an embodiment, the step in which the directional link content is generated according to the directional command includes that: when the object name is a user name in the collaboration platform, a directional link content capable of showing a contact card of a user corresponding to the user name is generated. Exemplarily, when the object name is the user name in the collaboration platform, the directional link content capable of showing the contact card of the user is generated. The contact card may include related information such as the name, gender, age, contact information and occupation of the user corresponding to the user name Other users of the collaboration platform may click on the directional link content to open the contact card of the user to quickly learn about the basic information of the user.

In an embodiment, the method further includes the following step: an interaction command for the contact card is received, and a communication window of the collaboration platform is called, where the communication window is configured to send a message to the user. Exemplarily, when the interaction command for the contact card is received, the communication window of the collaboration platform is called, and other users may send messages to the user corresponding to the contact card through the communication window, so that instant communication between users is achieved.

In an embodiment, the step in which the directional link content is generated according to the directional command includes that: when the object name is a document name, a directional link content capable of jumping to a document corresponding to the document name is generated. Exemplarily, when the first user or other collaboration users need to insert a reference document related to the target content into the collaboration area, an operation of "@+the document name" or "@+a document address" input by the user may be received, and the directional link content capable of jumping to the document is generated. The directional link may be the actual name of the document or the address link of the document. It is to be noted that the document may be an online document or a document stored in a computer, and a user may quickly open the document for viewing through the generated directional link.

In an embodiment, the step in which the directional link content is generated according to the directional command includes that: when the object name is a mail name, a directional link content capable of jumping to a mail corresponding to the mail name is generated. Exemplarily, when the first user needs to send a mail in terms of the target comment in the web page, that is, when the operation event triggered by the first user for the target content in the web page is a mail generation event, the mail name input by the user may be received, and the directional link content capable of jumping to the mail is generated. It is to be noted that a user may quickly open the mail body named by the mail name through the directional link content, and the mail body may include the target content in the web page for quick viewing by the user.

Figure 2:
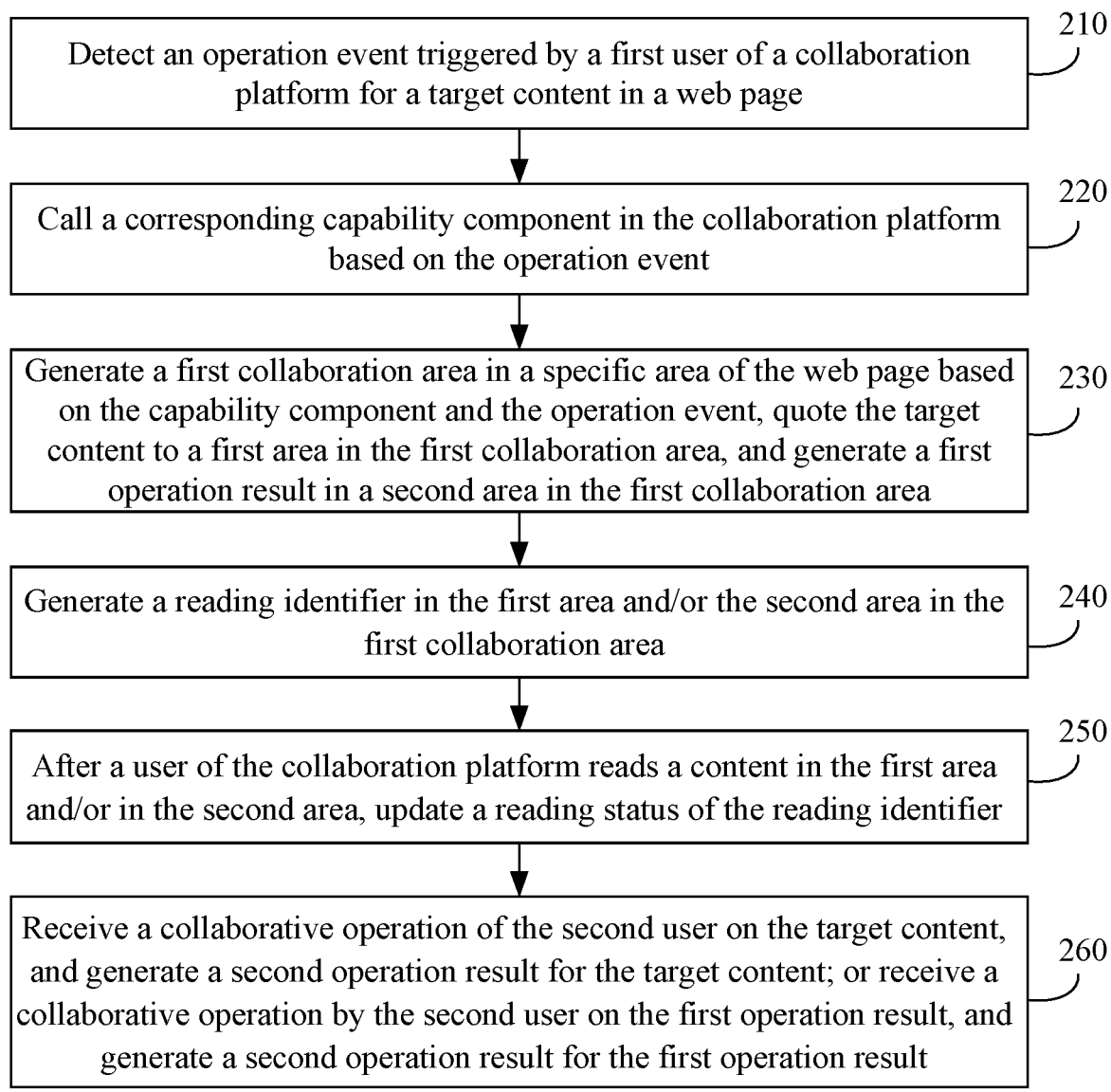
FIG. 2 is a flowchart of a page operation processing method according to another embodiment of the present disclosure.

FIG. 2 is a flowchart of a page operation processing method according to another embodiment of the present disclosure. As shown in FIG. 2, the method includes steps described below.

In step 210, an operation event triggered by a first user of a collaboration platform for a target content in a web page is detected.

In the embodiment of the present disclosure, the target content selected by the first user in the web page may be a text passage, a picture or a video segment. The embodiment of the present disclosure does not limit the target content.

In step 220, a corresponding capability component in the collaboration platform is called based on the operation event.

The collaboration platform has multiple functions, and different functions may be implemented by corresponding capability components. The capability component corresponding to the operation event in the cooperation platform is called according to the operation event, so that the web page starts a corresponding function.

In step 230, a first collaboration area is generated in a specific area of the web page based on the capability component and the operation event, the target content is quoted to a first area in the first collaboration area, and a first operation result is generated in a second area in the first collaboration area.

In step 240, a reading identifier is generated in the first area and/or the second area in the first collaboration area.

In step 250, after a user of the collaboration platform reads a content in the first area and/or the second area, a reading status of the reading identifier is updated.

In step 260, a collaborative operation of the second user on the target content is received, and a second operation result for the target content is generated; or a collaborative operation of the second user on the first operation result is received, and a second operation result for the first operation result is generated.

Figure 3:
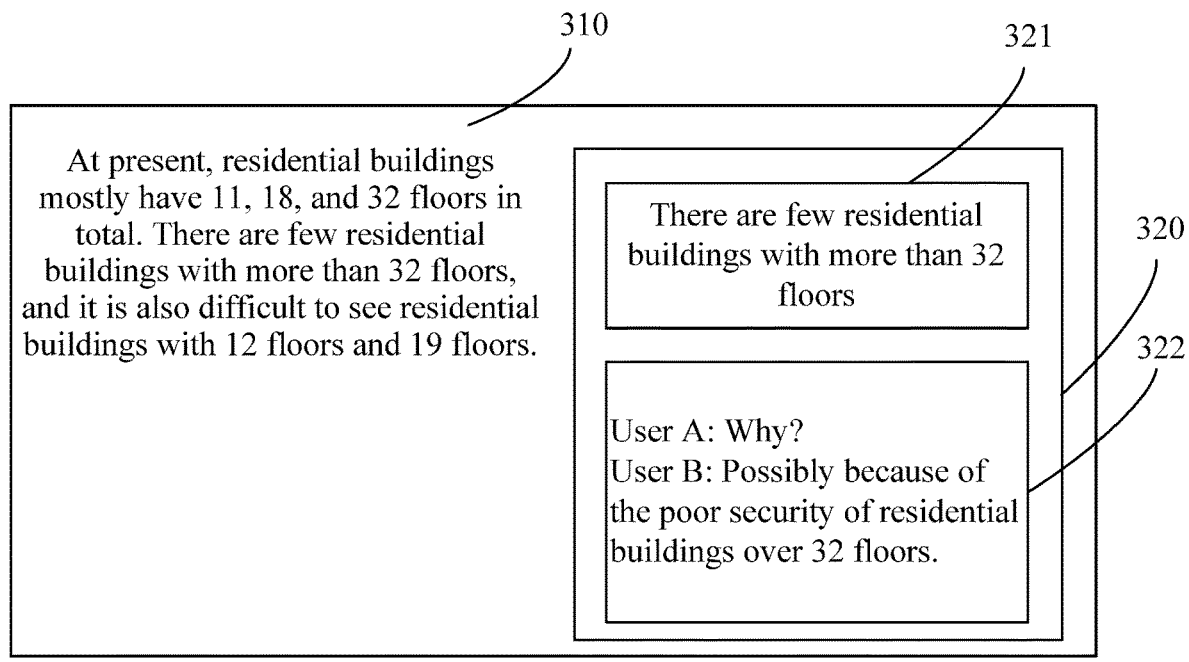
FIG. 3 is a diagram showing the effect of performing an operation on a page based on a collaboration platform according to an embodiment of the present disclosure.

FIG. 3 is a diagram showing the effect of performing an operation on a page based on a collaboration platform according to an embodiment of the present disclosure. As shown in FIG. 3, the operation event being a commenting event is taken as an example for explanation. The reference number 310 represents the web page; the reference number 320 represents the generated first collaboration area; the reference number 321 represents the first area in the first collaboration area, and the target content may be quoted to the first area; and the reference number 322 represents the second area in the first collaboration area, and the generated first operation result (that is, comment information of user A) and the second operation result (that is, comment information of user B) may be displayed in the second area.

According to the technical scheme of the embodiment of the present disclosure, a collaboration platform component is configured in the web page, so that the web page has functions corresponding to the collaboration platform. In this manner, when a user performs a related operation on a content in the web page, not only the page operation can be performed without leaving the web page to improve the efficiency of the operation of the user in the page, but also other users can directly perform a collaborative operation in the page to improve the capability for the interaction between users in the web page. In addition, the reading identifier is set, so that a read status or an unread status of the first operation result by one or more users may be displayed, and the first user can quickly know the attention to the first operation result paid by other users.

Figure 4:
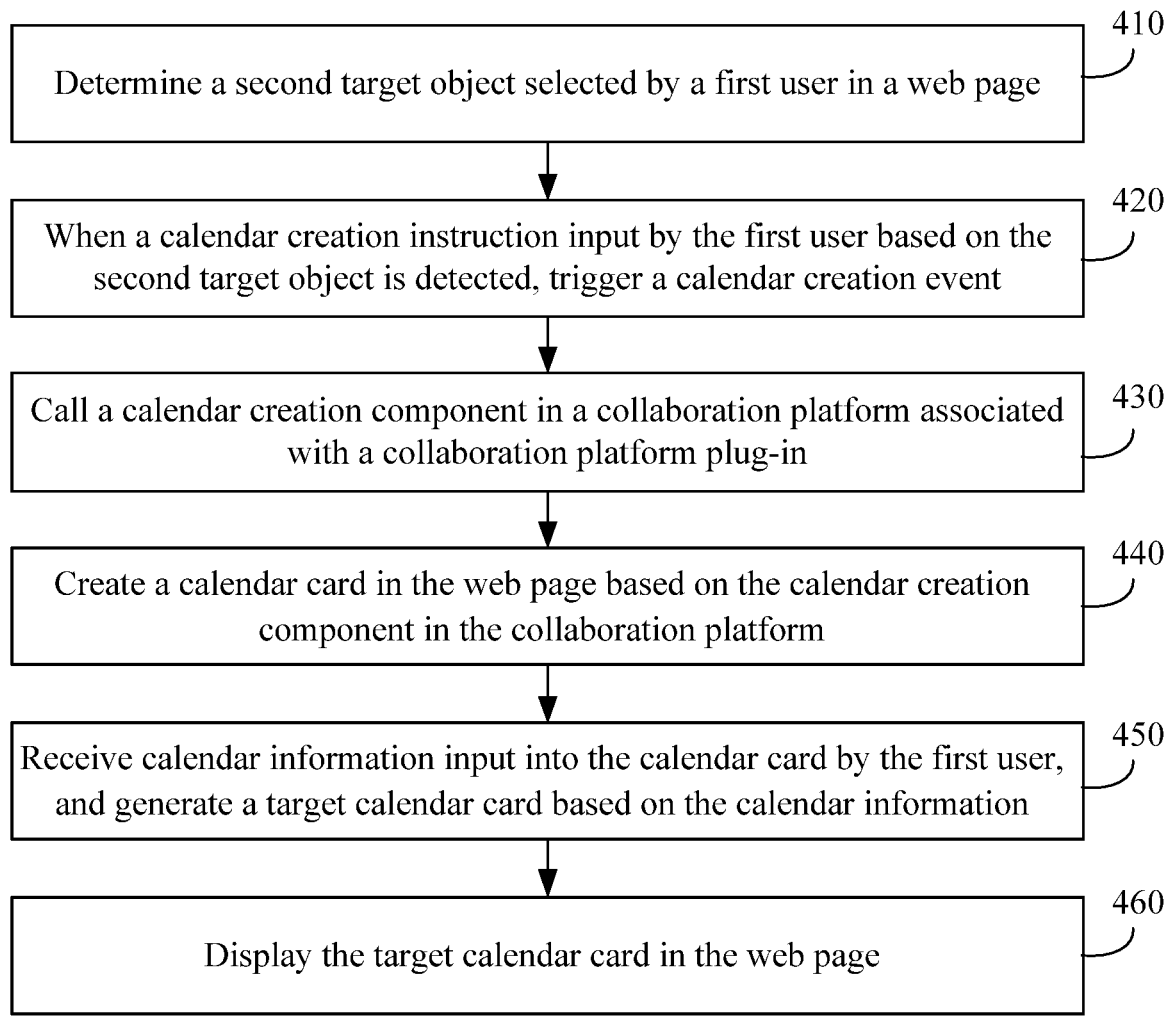
FIG. 4 is a flowchart of a page operation processing method according to another embodiment of the present disclosure.

FIG. 4 is a flowchart of a page operation processing method according to another embodiment of the present disclosure. The web page being a Web page and the operation event being a calendar creation event is taken as an example to explain the preceding embodiments. As shown in FIG. 4, the method includes steps described below.

In step 410, a second target object selected by a first user in a web page is determined.

In the embodiment of the present disclosure, the second target object selected by the first user in the web page may be a text passage, a picture or a video segment. It is to be noted that the embodiment of the present disclosure does not limit the second target object.

In step 420, when a calendar creation instruction input by the first user based on the second target object is detected, a calendar creation event is triggered.

In the embodiment of the present disclosure, the calendar creation instruction may be a preset voice instruction input by the first user, may be the first user clicking on a calendar generation button, or may be a preset gesture or a preset action input by the first user. The embodiment of the present disclosure does not limit the form of the calendar creation instruction.

In step 430, a calendar creation component in a collaboration platform associated with a collaboration platform plug-in is called.

The collaboration platform associated with the collaboration platform plug-in has multiple functions, and different functions may be implemented by corresponding capability components. When the calendar creation event triggered by the first user in the web page is detected, the calendar creation component in the collaboration platform is called, so that the web page starts a calendar creation function.

In step 440, a calendar card is created in the web page based on the calendar creation component in the collaboration platform.

The calendar card is created at a preset position in the web page based on a commenting component in the collaboration platform. The calendar card may include an area of a series of sub-cards to be input by the first user.

In step 450, calendar information input into the calendar card by the first user is received, and a target calendar card is generated based on the calendar information.

Exemplarily, the calendar information may include information such as the subject matter of the calendar, the members involved by the calendar, the time and place at which the content involved by the calendar is executed, etc. The target calendar card is generated according to the calendar information input by the first user. In an embodiment, when the target calendar card includes information of other users, a notification message may be generated based on the target calendar card, and the notification message and the calendar card are sent to the other users.

In step 460, the target calendar card is displayed in the web page.

According to the technical scheme of the embodiment of the present disclosure, when the calendar creation event triggered by the first user in the web page is detected, the calendar creation component in the collaboration platform associated with the collaboration platform plug-in is called, the calendar card is created in the web page based on the calendar creation component, and the calendar information input into the calendar card by the first user is received and displayed. According to the page operation processing method provided in the embodiment of the present disclosure, the collaboration platform plug-in is configured in the web page, so that the web page has the calendar creation function of the collaboration platform. In this manner, when a user creates a calendar in terms of a content of the web page, commenting in the page does not need to leave the web page, and thus the user experience is improved.

In some embodiments, the web page being a Web page is taken as an example, and after the operation event is responded (that is, the first operation result is generated) in the first collaboration area based on the collaboration platform, the following step is further included: an operation identifier corresponding to the operation event is added to the web page. In this manner, the operation identifier corresponding to the operation event is added to the web page, so that the first user or users other than the first user can quickly determine the type of the operation event performed by the first user in the web page directly according to the operation identifier. Exemplarily, different color marks may be added to the contents in the web page involved in different operation events as the operation identifiers corresponding to the different operation events. For example, if the first user comments on a piece of text in the web page, the piece of text may be marked as highlighted in yellow; if the first user translates a piece of text in the web page, the piece of text may be marked as red. Of course, the operation identifier corresponding to the operation event added to the web page may also be text. It is to be noted that the embodiment of the present disclosure does not limit the expression form of the operation identifier corresponding to the operation event.

In some embodiments, the web page being a Web page is taken as an example, and after the operation event triggered by the first user is responded in the web page based on the collaboration platform, the web page may feed back an operation behavior corresponding to the operation event to the collaboration platform, so that the cooperation platform aggregates the operation behaviors of multiple users. For example, collaboration platform A acquires information related to all users responding to user operations based on collaboration platform A in the web page, and aggregates and groups information related to the user operations in cooperation with an Artificial Intelligence (AI) algorithm; and the information related to the user operations is displayed in the page of collaboration platform A. For example, after the information related to the user operations is aggregated through the AI algorithm, a user can view the operations performed by multiple users in multiple web pages in the page of collaboration platform A, such as the comment page, comment content, translation information, search content and other related data which the users participate in.

Figure 5:
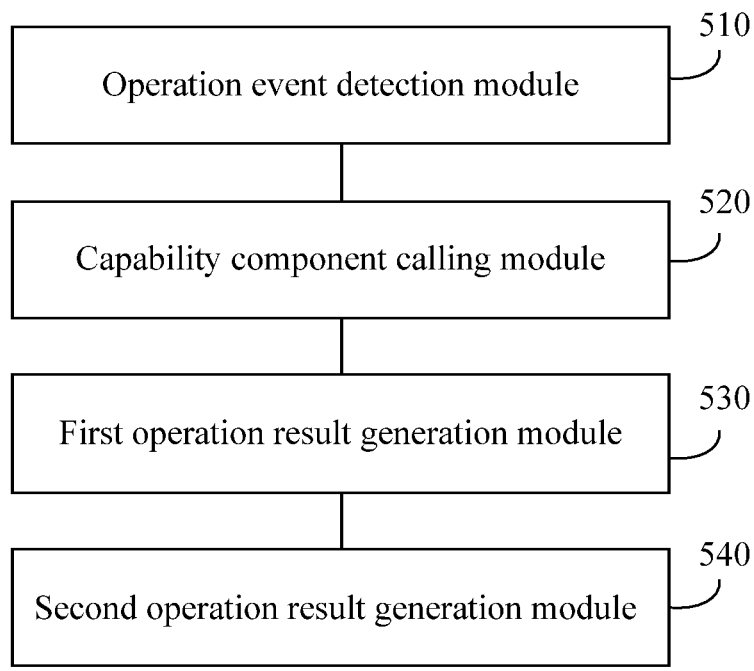
FIG. 5 is a structural diagram of a page operation processing apparatus according to another embodiment of the present disclosure.

FIG. 5 is a structural diagram of a page operation processing apparatus according to another embodiment of the present disclosure. As shown in FIG. 5, the apparatus includes an operation event detection module 510, a capability component calling module 520, a first operation result generation module 530 and a second operation result generation module 540.

The operation event detection module 510 is configured to detect an operation event triggered by a first user of a collaboration platform for a target content in a web page. The capability component calling module 520 is configured to call a corresponding capability component in the collaboration platform based on the operation event. The first operation result generation module 530 is configured to generate a first collaboration area in the web page based on the capability component and the operation event, and generate a first operation result in the first collaboration area. The second operation result generation module 540 is configured to receive a collaborative operation of a second user of the collaboration platform in the first collaboration area, and generate a second operation result.

According to the embodiment of the present disclosure, the operation event triggered by the first user of the collaboration platform for the target content in the web page is detected; the corresponding capability component in the collaboration platform is called based on the operation event; the first collaboration area is generated in the web page based on the capability component and the operation event, and the first operation result is generated in the first collaboration area; and the collaborative operation of the second user of the collaboration platform in the first collaboration area is received, and the second operation result is generated. According to the page operation processing method provided in the embodiment of the present disclosure, a collaboration platform component is configured in the web page, so that the web page has functions corresponding to the collaboration platform. In this manner, when a user performs a related operation on a content in the web page, not only the page operation can be performed without leaving the web page to improve the efficiency of the operation of the user in the page, but also other users can directly perform a collaborative operation in the page to improve the capability for the interaction between users in the web page.

In an embodiment, the first operation result generation module is configured to generate the first collaboration area in a specific area of the web page, quote the target content to a first area in the first collaboration area, and generate the first operation result in a second area in the first collaboration area.

In an embodiment, the apparatus further includes a reading identifier generation module and a reading status updating module. The reading identifier generation module is configured after the first operation result is generated in the second area in the first collaboration area, generate a reading identifier in the first area and/or the second area in the first collaboration area. The reading status updating module is configured to after a user of the collaboration platform reads a content in the first area and/or the second area, update a reading status of the reading identifier.

In an embodiment, the second operation result generation module is configured to receive a collaborative operation of the second user on the target content, and generate a second operation result for the target content; or receive a collaborative operation of the second user on the first operation result, and generate a second operation result for the first operation result.

In an embodiment, the first operation result generation module includes a link content generation unit. The link content generation unit is configured to in a case where a directional command is received in the first collaboration area, generate a directional link content according to the directional command, where the directional command includes a directional identifier and an object name.

In an embodiment, when the object name is a user name in the collaboration platform, the apparatus further includes a notification message sending module. The notification message sending module is configured to send a notification message to a user corresponding to the user name, where the notification message includes the target content and/or the first operation result, so that the user turns to the web page through the notification message.

In an embodiment, the link content generation unit is configured to when the object name is a user name in the collaboration platform, generate a directional link content capable of showing a contact card of a user corresponding to the user name.

In an embodiment, the apparatus further includes a communication window calling module. The communication window calling module is configured to receive an interaction command for the contact card, and call a communication window of the collaboration platform, where the communication window is configured to send a message to the user.

In an embodiment, the link content generation unit is configured to when the object name is a document name, generate a directional link content capable of jumping to a document corresponding to the document name.

Figure 6:
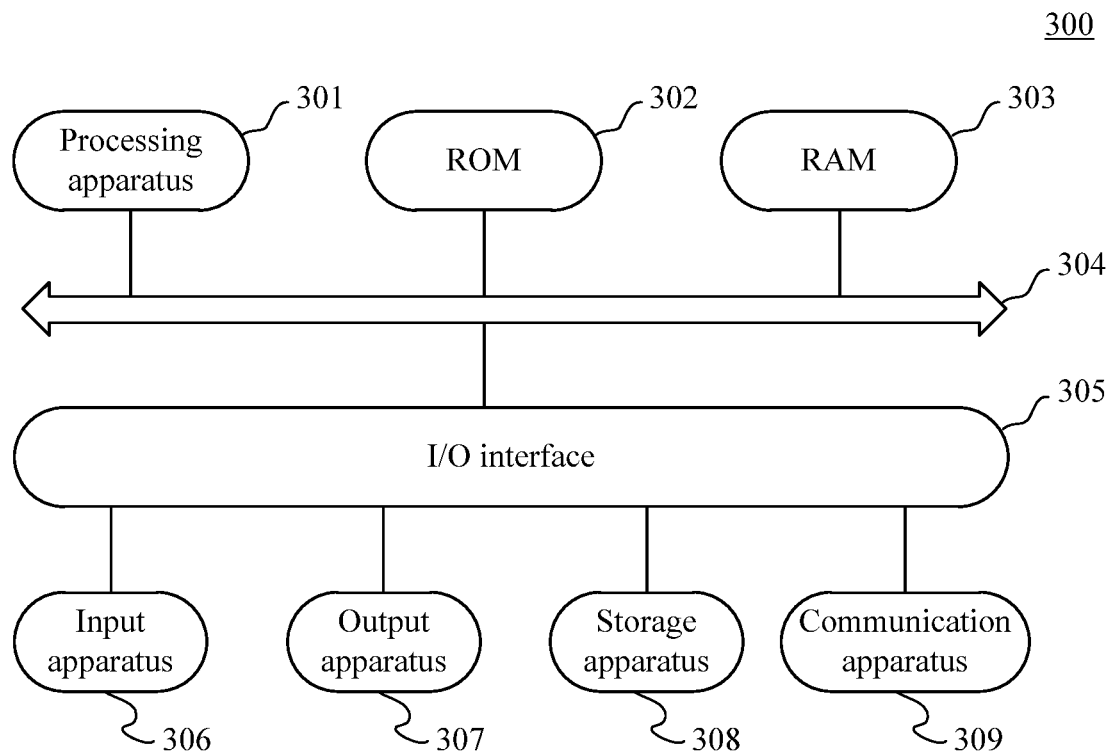
FIG. 6 is a structural diagram of an electronic device according to another embodiment of the present disclosure.

The preceding apparatus may execute the method provided in all embodiments of the present disclosure, and has functional modules for executing the method. For the technical details not described in detail in the embodiment of the present disclosure, reference may be made to the preceding methods provided by all embodiments of the present disclosure Referring to FIG. 6, FIG. 6 shows a structural diagram of an electronic device 300 applicable to implementing the embodiment of the present disclosure. The electronic device in the embodiment of the present disclosure may include, but is not limited to, mobile terminals such as a mobile phone, a laptop, a digital broadcast receiver, a personal digital assistant (PDA), a portable Android device (PAD), a portable media player (PMP), and an in-vehicle terminal (such as an in-vehicle navigation terminal), stationary terminals such as a digital television (TV) and a desktop computer, or multiple forms of servers such as stand-alone servers or server clusters. The electronic device shown in FIG. 6 is merely an example and is not intended to limit the function and usage scope of the embodiments of the present disclosure.

As shown in FIG. 6, the electronic device 300 may include a processing apparatus 301 (such as a central processing unit and a graphics processing unit). The processing apparatus 301 may perform multiple types of appropriate operations and processing based on a program stored in a read-only memory (ROM) 302 or a program loaded from a storage apparatus 308 to a random-access memory (RAM) 303. Multiple programs and data required for the operation of the electronic device 300 are also stored in the RAM 303. The processing apparatus 301, the ROM 302 and the RAM 303 are connected to each other through a bus 304. An input/output (I/O) interface 305 is also connected to the bus 304.

The following apparatus may be connected to the I/O interface 305: an input apparatus 306 such as a touch screen, a touch pad, a keyboard, a mouse, a camera, a microphone, an accelerometer, and a gyroscope; an output apparatus 307 such as a liquid crystal display (LCD), a speaker, and a vibrator; the storage apparatus 308 such as a magnetic tape and a hard disk, and a communication apparatus 309. The communication apparatus 309 may allow the electronic device 300 to perform wireless or wired communication with other devices so as to exchange data. Although FIG. 6 shows the electronic device 300 having multiple apparatuses, it is to be understood that not all of the apparatuses shown herein need to be implemented or present. Alternatively, more or fewer apparatuses may be implemented or present.

According to the embodiments of the present disclosure, the process described above with reference to the flowcharts may be implemented as a computer software program. For example, the embodiment of the present disclosure includes a computer program product. The computer program product includes a computer program carried in a computer-readable medium. The computer program includes program codes for executing the term recommending method. In such an embodiment, the computer program may be downloaded from a network and installed through the communication apparatus 309, or may be installed from the storage apparatus 308, or may be installed from the ROM 302. When the computer program is executed by the processing apparatus 301, the preceding functions defined in the method of the embodiments of the present disclosure are executed.

The preceding computer-readable medium in the present disclosure may be a computer-readable signal medium or a computer-readable storage medium or any combination thereof. The computer-readable storage medium, for example, may be, but is not limited to, an electronic, magnetic, optical, electromagnetic, infrared or semiconductor system, apparatus or device or any combination thereof. The examples of the computer-readable storage medium may include, but are not limited to, an electrical connection with one or more wires, a portable computer magnetic disk, a hard disk, an RAM), an ROM, an erasable programmable read-only memory (EPROM), a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or used in conjunction with an instruction execution system, apparatus, or device. The program codes included on the computer-readable medium may be transmitted via any appropriate medium which includes, but is not limited to, a wire, an optical cable, a radio frequency (RF), or any appropriate combination thereof.

In some embodiments, clients and servers may communicate using any network protocol currently known or to be developed in the future, such as the HyperText Transfer Protocol (HTTP), and may be interconnected with digital data communication (for example, a communication network) in any form or medium. Examples of the communication network include a local area network (LAN), a wide area network (WAN), an internet (such as the Internet), and a peer-to-peer network (such as a multi-hop Ad-Hoc network), as well as any network currently known or to be developed in the future.

The preceding computer-readable medium may be included in the preceding electronic device or may exist alone without being assembled into the electronic device.

The preceding computer-readable medium carries one or more programs which, when executed by the electronic device, cause the electronic device to: detect a operation event triggered by a first user of a collaboration platform for a target content in a web page; call a corresponding capability component in the collaboration platform based on the operation event; generate a first collaboration area in the web page based on the capability component and the operation event, and generate a first operation result in the first collaboration area; and receive a collaborative operation of a second user of the collaboration platform in the first collaboration area, and generate a second operation result.

Computer program codes for executing the operations in the present disclosure may be written in one or more programming languages or a combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case relate to the remote computer, the remote computer may be connected to the user computer via any kind of network including an LAN or a WAN, or may be connected to an external computer (for example, via the Internet through an Internet service provider).

The flowcharts and block diagrams in the drawings show the possible architecture, function and operation of the system, method and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The name of a unit is not intended to limit the unit in a certain circumstance.

The functions described above herein may be executed, at least partially, by one or more hardware logic components. For example, without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, an RAM), an ROM, an EPROM, a flash memory, an optical fiber, a portable CD-ROM, an optical storage device, a magnetic storage device, or any suitable combination thereof.

According to one or more embodiments of the present disclosure, a page operation processing method is provided and includes the following steps: an operation event triggered by a first user of a collaboration platform for a target content in a web page is detected; a corresponding capability component in the collaboration platform is called based on the operation event; a first collaboration area is generated in the web page based on the capability component and the operation event, and a first operation result is generated in the first collaboration area; and a collaborative operation of a second user of the collaboration platform in the first collaboration area is received, and a second operation result is generated.

The step in which the first collaboration area is generated in the web page, and the first operation result is generated in the first collaboration area includes the following steps: the first collaboration area is generated in a specific area of the web page, the target content is quoted to a first area in the first collaboration area, and the first operation result is generated in a second area in the first collaboration area.

After the first operation result is generated in the second area in the first collaboration area, the method further includes the following steps: a reading identifier is generated in the first area and/or the second area in the first collaboration area; after a user of the collaboration platform reads a content in the first area and/or the second area, a reading status of the reading identifier is updated.

The step in which the collaborative operation of the second user of the collaboration platform in the first collaboration area is received, and the second operation result is generated includes the following step: a collaborative operation of the second user on the target content is received, and a second operation result for the target content is generated; or, a collaborative operation of the second user on the first operation result is received, and a second operation result for the first operation result is generated.

The step in which the first operation result is generated in the first collaboration area includes the following step: when a directional command is received in the first collaboration area, a directional link content is generated according to the directional command, where the directional command includes a directional identifier and an object name.

When the object name is a user name in the collaboration platform, the method further includes the following step: a notification message is sent to a user corresponding to the user name, where the notification message includes the target content and/or the first operation result, so that the user turns to the web page through the notification message.

The step in which the directional link content is generated according to the directional command includes the following step: when the object name is a user name in the collaboration platform, a directional link content capable of showing a contact card of a user corresponding to the user name is generated.

The method further includes the following step: an interaction command for the contact card is received, and a communication window of the collaboration platform is called, where the communication window is configured to send a message to the user.

The step in which the directional link content is generated according to the directional command includes the following step: when the object name is a document name, a directional link content capable of jumping to a document corresponding to the document name is generated.

What is claimed is:

1. A page operation processing method, comprising:
   detecting an operation event triggered by a first user of a collaboration platform for a target content in a web page, wherein the web page does not belong to the collaboration platform, and a plug-in of the collaboration platform is preconfigured in the web page to enable the web page to have functions corresponding to the collaboration platform;
   calling, based on the operation event, a capability component of the plug-in of the collaboration platform corresponding to the operation event;
   generating a first collaboration area in the web page based on the capability component and the operation event, and generating a first operation result in the first collaboration area in response to the operation event; and
   receiving a collaborative operation, which is performed by a second user of the collaboration platform in the first collaboration area, and generating a second operation result,
   wherein generating the first collaboration area in the web page, and generating the first operation result in the first collaboration area comprises:
   generating the first collaboration area in a specific area of the web page, quoting the target content to a first area in the first collaboration area, and generating the first operation result in a second area in the first collaboration area, and
   wherein receiving the collaborative operation, which is performed by the second user of the collaboration platform in the first collaboration area, and generating the second operation result comprises:
   receiving the collaborative operation performed by the second user on the first operation result, and generating the second operation result for the first operation result.

2. The method according to claim 1, after generating the first operation result in the second area in the first collaboration area, further comprising one of the following:
   generating a reading identifier in the first area in the first collaboration area, and after a user of the collaboration platform reads a content in the first area, updating a reading status of the reading identifier;
   generating a reading identifier in the second area in the first collaboration area, and after a user of the collaboration platform reads a content in the second area, updating a reading status of the reading identifier; or
   generating a reading identifier in the first area in the first collaboration area and a reading identifier in the second area in the first collaboration area; after a user of the collaboration platform reads a content in the first area, updating a reading status of the reading identifier in the first area; and after a user of the collaboration platform reads a content in the second area, updating a reading status of the reading identifier in the second area.

3. The method according to claim 1, wherein generating the first operation result in the first collaboration area comprises:
   when a directional command is received in the first collaboration area, generating a directional link content according to the directional command, wherein the directional command comprises a directional identifier and an object name.

4. The method according to claim 1, wherein generating the first operation result in the first collaboration area comprises:
   when a directional command is received in the first collaboration area, generating a directional link content according to the directional command, wherein the directional command comprises a directional identifier and an object name.

5. The method according to claim 3, wherein when the object name is a user name in the collaboration platform, the method further comprises:
   sending a notification message to a user corresponding to the user name, wherein the notification message comprises at least one of the target content or the first operation result, so that the user turns to the web page through the notification message.

6. The method according to claim 3, wherein generating the directional link content according to the directional command comprises:
   when the object name is a user name in the collaboration platform, generating a directional link content capable of showing a contact card of a user corresponding to the user name.

7. The method according to claim 6, further comprising:
   receiving an interaction command for the contact card, and calling a communication window of the collaboration platform, wherein the communication window is configured to send a message to the user.

8. The method according to claim 3, wherein generating the directional link content according to the directional command comprises:
   when the object name is a document name, generating a directional link content capable of jumping to a document corresponding to the document name.

9. An electronic device, comprising:
   at least one processing apparatus; and
   a storage apparatus configured to store at least one program;
   wherein the at least one program, when executed by the at least one processing apparatus, causes the at least one processing apparatus to implement:
   detecting an operation event triggered by a first user of a collaboration platform for a target content in a web page, wherein the web page does not belong to the collaboration platform, and a plug-in of the collaboration platform is preconfigured in the web page to enable the web page to have functions corresponding to the collaboration platform;

calling, based on the operation event, a capability component of the plug-in of the collaboration platform corresponding to the operation event;

generating a first collaboration area in the web page based on the capability component and the operation event, and generating a first operation result in the first collaboration area in response to the operation event; and receiving a collaborative operation, which is performed by a second user of the collaboration platform in the first collaboration area, and generating a second operation result, wherein generating the first collaboration area in the web page, and generating the first operation result in the first collaboration area comprises:

generating the first collaboration area in a specific area of the web page, quoting the target content to a first area in the first collaboration area, and generating the first operation result in a second area in the first collaboration area, and wherein receiving the collaborative operation, which is performed by the second user of the collaboration platform in the first collaboration area, and generating the second operation result comprises:

receiving the collaborative operation performed by the second user on the first operation result, and generating the second operation result for the first operation result.

10. The electronic device of claim 9, wherein the at least one program, when executed by the at least one processing apparatus, causes the at least one processing apparatus to further implement, after generating the first operation result in the second area in the first collaboration area, one of the following:

generating a reading identifier in the first area in the first collaboration area, and after a user of the collaboration platform reads a content in the first area, updating a reading status of the reading identifier;

generating a reading identifier in the second area in the first collaboration area, and after a user of the collaboration platform reads a content in the second area, updating a reading status of the reading identifier; or generating a reading identifier in the first area in the first collaboration area and a reading identifier in the second area in the first collaboration area; after a user of the collaboration platform reads a content in the first area, updating a reading status of the reading identifier in the first area; and after a user of the collaboration platform reads a content in the second area, updating a reading status of the reading identifier in the second area.

11. The electronic device of claim 9, wherein the at least one program, when executed by the at least one processing apparatus, causes the at least one processing apparatus to implement generating the first operation result in the first collaboration area in the following way:

when a directional command is received in the first collaboration area, generating a directional link content according to the directional command, wherein the directional command comprises a directional identifier and an object name.

12. The electronic device of claim 9, wherein the at least one program, when executed by the at least one processing apparatus, causes the at least one processing apparatus to implement generating the first operation result in the first collaboration area in the following way:

when a directional command is received in the first collaboration area, generating a directional link content according to the directional command, wherein the directional command comprises a directional identifier and an object name.

13. The electronic device of claim 11, wherein when the object name is a user name in the collaboration platform, the at least one program, when executed by the at least one processing apparatus, causes the at least one processing apparatus to further implement:

sending a notification message to a user corresponding to the user name, wherein the notification message comprises at least one of the target content or the first operation result, so that the user turns to the web page through the notification message.

14. A non-transitory computer-readable storage medium storing a computer program, wherein the computer program, when executed by a processing apparatus, implements:

detecting an operation event triggered by a first user of a collaboration platform for a target content in a web page, wherein the web page does not belong to the collaboration platform, and a plug-in of the collaboration platform is preconfigured in the web page to enable the web page to have functions corresponding to the collaboration platform;

calling, based on the operation event, a capability component of the plug-in of the collaboration platform corresponding to the operation event;

generating a first collaboration area in the web page based on the capability component and the operation event, and generating a first operation result in the first collaboration area in response to the operation event; and receiving a collaborative operation, which is performed by a second user of the collaboration platform in the first collaboration area, and generating a second operation result, wherein generating the first collaboration area in the web page, and generating the first operation result in the first collaboration area comprises:

generating the first collaboration area in a specific area of the web page, quoting the target content to a first area in the first collaboration area, and generating the first operation result in a second area in the first collaboration area, and wherein receiving the collaborative operation, which is performed by the second user of the collaboration platform in the first collaboration area, and generating the second operation result comprises:

receiving the collaborative operation performed by the second user on the first operation result, and generating the second operation result for the first operation result.

* * * * *